United States Patent
Bischoff et al.

[11] Patent Number: 5,662,809
[45] Date of Patent: Sep. 2, 1997

[54] CATALYTIC FLUIDIZED BED PROCESS FOR TREATING AQUEOUS LIQUIDS

[75] Inventors: Michael Bischoff, Braunschweig; Dirk Bonse, Lehrte; Michael Sell, Peine, all of Germany

[73] Assignee: Solvay Umweltchemie GmbH, Hannover, Germany

[21] Appl. No.: 295,908
[22] PCT Filed: Mar. 8, 1993
[86] PCT No.: PCT/EP93/00524
§ 371 Date: Sep. 12, 1994
§ 102(e) Date: Sep. 12, 1994
[87] PCT Pub. No.: WO93/17973
PCT Pub. Date: Sep. 16, 1993

[30] Foreign Application Priority Data

Mar. 13, 1992 [DE] Germany ............... 42 07 962.4

[51] Int. Cl.$^6$ ................................. C02F 1/70
[52] U.S. Cl. ................. 210/757; 210/763; 210/903
[58] Field of Search ..................... 210/749, 750, 210/757, 763, 764, 903

[56] References Cited

U.S. PATENT DOCUMENTS

| | | | |
|---|---|---|---|
| 3,901,660 | 8/1975 | Ohorodnik et al. | 210/188 |
| 4,141,828 | 2/1979 | Okada et al. | 210/762 |
| 4,294,706 | 10/1981 | Kakihara et al. | 210/762 |
| 4,348,289 | 9/1982 | Snavely, Jr. et al. | 210/749 |
| 4,789,488 | 12/1988 | DeSilva | 210/757 |
| 4,853,135 | 8/1989 | Oeckl et al. | |
| 4,883,594 | 11/1989 | Sekoulov et al. | |
| 4,956,057 | 9/1990 | Stucki et al. | 210/903 |
| 4,990,266 | 2/1991 | Vorlop et al. | |
| 5,108,624 | 4/1992 | Bossler et al. | 210/750 |
| 5,122,496 | 6/1992 | Vorlop et al. | |

FOREIGN PATENT DOCUMENTS

| | | | |
|---|---|---|---|
| 345822 | 12/1989 | European Pat. Off. | |
| 359074 | 3/1990 | European Pat. Off. | |
| 3906781 | 9/1990 | Germany | 210/757 |
| 60-129189 | 7/1985 | Japan | |
| 4-48988 | 2/1992 | Japan | 210/903 |
| 4-293503 | 10/1992 | Japan | 210/750 |
| WO87/00517 | 1/1987 | WIPO | |

*Primary Examiner*—Stanley S. Silverman
*Assistant Examiner*—Theodore M. Green
*Attorney, Agent, or Firm*—Evenson, McKeown, Edwards & Lenahan P.L.L.C.

[57] ABSTRACT

In a process for the catalytic treatment of aqueous liquids containing germs, for example, for the catalytic removal of oxygen, nitrite or nitrate in drinking, culinary or waste water, the germ contamination of a catalysts which are used can be prevented when the process is carried out in the fluidized bed.

3 Claims, 1 Drawing Sheet

CATALYTIC FLUIDIZED BED PROCESS FOR TREATING AQUEOUS LIQUIDS

The invention relates to a process for the catalytic treatment of aqueous liquids containing germs.

A number of processes are known in which aqueous liquids are treated catalytically. It may, for example, be desirable to reduce or remove the oxygen content of aqueous liquids. Thus, it is known to lower the oxygen content in water which is used is a coolant in technical equipment and therefore reduce the corrosiveness of the water. The oxygen content is also advantageously reduced in drinking water or in water used for the manufacturing of food products and semi-luxury food items, such as alcoholic or non-alcoholic beverages. It is also known that the nitrite and/or nitrate content in drinking, commercial or waste water must be reduced. A corresponding catalytically operating process is described in European Patent Document EP-A-0 359 074 (U.S. Pat. No. 4,990,266).

The catalytic treatment for reducing the oxygen, nitrite and/or nitrate content in aqueous liquids, for example, is carried out such that the aqueous liquid is mixed with hydrogen and is then guided through a suitable catalyst. Normally, carrier catalysts are used which contain one or several platinum group metals as well as optionally, in addition, other metals, such as metals of the copper group.

It presents a problem that aqueous liquids, such as well water, drinking water, commercial water or waste water, which are to be treated catalytically, normally contain microorganisms. A gradual contamination of the catalyst can then be observed. The treatment of the aqueous liquids with UV-light, for example, is no perfect remedy. Other measures, such as the addition of biocides, are not appropriate, particularly in the drinking water field.

The published Japanese Patent Application JP 60/129188 (Patent Abstracts of Japan 9, No. 283, C-313 (1985)), discloses the decomposition of reducing substances such as hydrazine, hydrazide or hydrazone in waste water from steam boilers, whereby the catalyst is contained in a fixed bed or in a fluidized bed.

The EP-A 345,822 discloses catalyst resins with high stability and catalytic activity of long duration. The resins can be used for removing the oxygen from drinking water, sea water and brackish water as well as from condensate.

It is an object of the invention to provide a process by means of which it is possible to catalytically treat aqueous liquids without any contamination of the catalyst. This object is achieved by means of the process indicated in the claims.

Surprisingly, it was found that a contamination of the catalyst during the catalytic treatment of aqueous liquids containing germs can be prevented when the process is carried out in a fluidized bed. The process according to the invention for the catalytic treatment of aqueous liquids containing germs, during which the aqueous liquid is guided through a catalyst, is characterized in that particle-shaped carrier catalysts are used which have a particle size of from 0.1 to 10 mm, and the catalytic treatment is carried out in the fluidized bed in the absence of hydrazine, hydrazide and hydrazone and while the liquid to be treated flows through a reactor.

Preferably, carrier catalysts are used, particularly spherical carrier catalysts. The diameter preferably amounts to from 0.1 mm to 1.0 mm, particularly preferably from 0.3 to 0.8 mm.

The process according to the invention is particularly advantageously used in the case of such aqueous liquids which are used for the manufacturing of food products or semi-luxury food items, for example, for the treatment of drinking water or well water, for the manufacturing of food products or of beverages, such as alcoholic and non-alcoholic beverages.

According to a variant, the process is applied to the reductive removal of oxygen from aqueous liquids. Carrier catalysts will then preferably be used which comprise one or several platinum group metals, such a platinum or palladium, and optionally other additions on conventional ceramic carrier material which promote the catalytic activity, such as silicon dioxide, aluminosilicate or aluminum oxide.

According to another variant, the process according to the invention is applied to the removal or reduction of the nitrite and/or nitrate content of nitrite- and/or nitrate-laden water with the selective formation of nitrogen. For the treatment of water which is only nitrite-laden, a catalyst is used whose metal constituent consists of palladium and/or rhodium. If the water to be treated also contains nitrate, a carrier catalyst is used whose metal constituent consists of palladium or of a metal of the copper group or of rhodium and optionally of palladium.

The process according to the invention may naturally also be used for the catalytic treatment of aqueous liquids for other purposes. For example, German Patent Document DE-OS 39 06 781 describes a process in which the nitrite or nitrate content is quantitatively converted to ammonium. This takes place by means of carrier catalysts which comprise a porous catalyst which is impregnated with platinum and/or iridium and optionally, in addition, with nickel or copper. This process is used in analysis.

Figure 1:
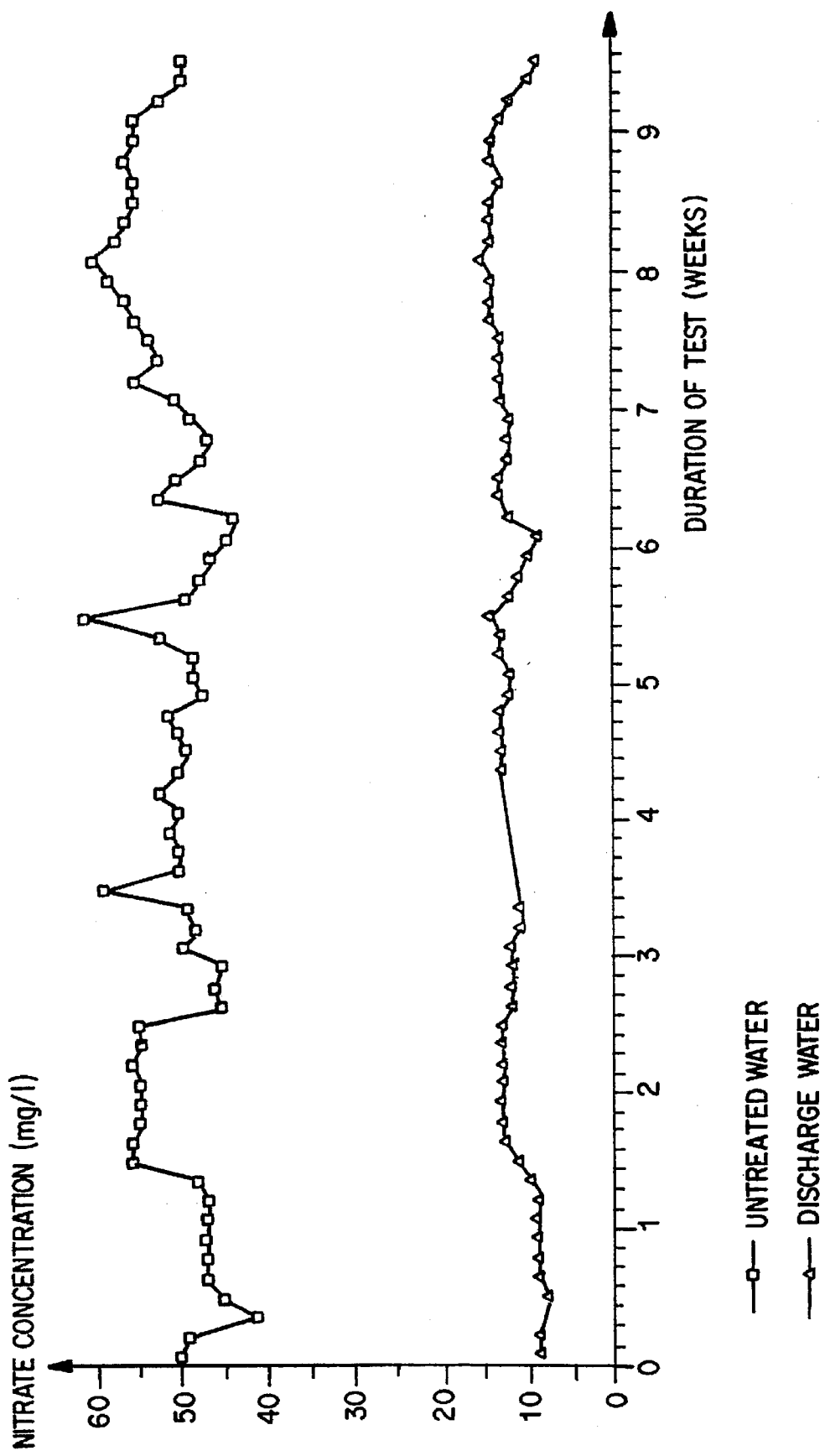
FIG. 1 shows the nitrate concentrations of the untreated and treated ground water.

The following examples have the purpose of further explaining the invention without limiting its scope.

EXAMPLE 1

Preparation of the Catalyst 1.1. Preparation of the Carrier:

The build-up granulation method is used. 140 kg germinating agents (undersize particles from an earlier build-up granulation containing 70% by weight of aluminum oxide and 30% by weight of water; particle size smaller than 0.5 mm) were sprayed with 3 l of water.

Subsequently, 105 kg of an aluminum oxide mixture were produced in that amorphous, microdispersed oxide of aluminum (commercial product HLS$^R$ of the Firm Martinswerk, Bergheim) and aluminum oxide of the boehmite type (commercial product Condea Pural SB$^R$ of the firm Condea, Brunsbuettel) were mixed with one another at a weight ratio of 40:12.5. Together with the 140 kg of germinating agents, this aluminum oxide mixture was charged into a rotary table. Approximately 32.6 kg of water were sprayed into the rotating mass in the course of 4 hours.

Then 132 kg of the above-described aluminum oxide mixture with the indicated weight ratio of amorphous aluminum oxide and aluminum oxide of the boehmite type were added once more to the mass situated in the rotary plate. Over the course of 2.5 hours, an additional 42 kg of water were then sprayed into the rotating mass. Then the mass was revolved again for 20 minutes and was aged for 16 hours in the stopped rotary plate.

While 3 kg of water were added in a metered fashion, the aged mass was revolved again for 15 minutes in the rotary table and was then sifted. Undersize particles (particle diameter smaller than 0.5 mm) and oversize particles (particle diameter larger than 0.68 mm), after a reduction in size, were returned as germinating agents into a later build-up granulation.

The fraction having a particle size of from 0.5 to 0.68 mm was then dried for 16 hours at 150° C.
Yield:
188 kg of dry product of the composition 85% by weight of aluminum oxide, balance water.

Then 10 kg of material were removed from the predried product and were first predried for 4 hours at 600° C. and were then calcined for 5 hours at 1,050° C.
Yield:
8.5 kg of spherical aluminum oxide consisting of "theta" and "kappa" modifications with traces of "alpha" modification. The material was free of "gamma" and "delta" modifications.
Maximum of the Pore Diameter:
850 Å. The diameters of the pores are distributed over a range of between approximately 60 Å and 1,800 Å.
Specific surface, measured according to the mercury porosimetry
method: 45 m²/g;
Pore volume: 0.40 ml/g;
Median pore diameter: 356 Å.

1.2. Application of the Catalytically Active Component:

The carrier material prepared according to Example 1 was used. A fraction was used which was determined to be particularly advantageous and had a grain size of between 400 and 680 micrometers which had an oversize grain proportion or undersize grain proportion of less than 3% respectively. The grain size range within the range of from 400 to 680 micrometers took place according to the Gaussian distribution.

The preparation of the catalysts took place by applying the catalytically active metal compounds to the carrier material, in which case one of the following methods was used.

a) 30 g of the carrier material of the above-mentioned fraction prepared according to Example 1 were charged into 219 ml of an aqueous tetraammonium palladium (II) hydroxide solution with a palladium content of 2.74 g/l; i.e., a total content of 0.6 g palladium, in a 250 ml round flask. The solution was concentrated during a period of 2 hours at 60° C. and 30 mbar until dry. The obtained impregnated carrier was dried for 1 hour at 110° C. and the dried carrier was calcined for another 0.5 hours at 550° C.

The application of copper took place under analogous conditions. For producing the cupric salt solution, 0.47 g copper(II) acetate monohydrate (corresponding to 0.15 g copper) were dissolved in 100 ml deionized water. The impregnated carrier was then dried for 2 hours at 110° C. For the reduction of the metals, the impregnated and dried carrier was subjected for 8 hours at 350 ° C. to a hydrogen atmosphere in an externally heated quartz tube.

According to an analysis, the finished catalyst had a palladium content of 2.0±0.05% by weight and a copper content of 0.5±0.02% by weight. The relative abrasion number corresponded to the abrasion number of the carrier material.

b) 50.42 g of the carrier material of the above-mentioned fraction were charged into a solution of 1.68 g of palladium dichloride, which corresponds to 1.0 g of palladium, in 11.75 ml 1-molar hydrochloric acid and 22.7 ml acetone, in a 250 ml round flask. The solution was stirred for 30 minutes while connected to a rotary evaporator. The solvents were evaporated for a period of 60 minutes at 60° C. and 50 mbar. The carrier impregnated with palladium was then dried for 1 hour at 150° C. and was calcined for 0.5 hours at 550° C. For the application of the copper, the carrier impregnated with palladium was placed in a solution of 0.79 g copper(II) acetate monohydrate, which corresponds to 0.25 g copper, in 30 ml water and was treated in a rotary evaporator as mentioned above. The carrier impregnated with palladium and copper was then dried for 1 hour at 100° C. and was finally reduced, as described in a).

The analysis corresponded to the values obtained according to method a).

EXAMPLE 2

Use of the Carrier Catalyst Prepared According to Example 1 and Containing Palladium and Copper for the Removal of Oxygen and Nitrate from Water in the Fluidized Bed.

Equipment Used:

An untreated-water pipe first led into an air filter and then into a pressure intensifier. A pipe led from the pressure intensifier into a gasifying reactor. In this gasifying reactor, hydrogen could be introduced through silicone membranes into the water. The gasifying reactor was connected with a reactor in which the catalytic oxygen and nitrate decomposition was carried out. This reactor contained 22 kg of the carrier catalyst prepared according to Example 1 and containing palladium and copper. A discharge pipe for the treated water led out of the reactor into an air filter. The water leaving the air filter could then be supplied to the respective usage as pure water.

Implementation of Experiment:

The experiment was carried out during a period of more than 9 weeks in a waterworks facility in Lower Saxony. The nitrate content of the untreated water (ground water) fluctuated between 40 mg and 60 mg per liter. The oxygen content amounted to 4.2 mg/l. The temperature of the untreated water was 11° C.

The untreated water was initially passed through the air filter and was then brought to a water pressure of 5 bar in the pressure intensifier. In the gasifying reactor, the water was mixed with the hydrogen. The hydrogen-laden water was led through the reactor at a flow of 2,000 liters per hour and, in the reactor, the carrier catalyst material was held in the fluidized bed. The nitrate content of the nitrate-laden ground water to be treated as well as the nitrate content of the treated ground water were recorded during a period of more than 9 weeks. FIG. 1 indicates the nitrate concentrations of the untreated and of the treated ground water which were determined by way of a plurality of measurements. The nitrate decomposition performance could be determined at 3.5 g nitrate per kilogram catalyst and hour.

Some analysis data of the untreated and treated ground water are compiled in the following table.

TABLE 1

Analysis Data of the Untreated and Treated Ground Water

| Parameter | Untreated Ground Water | Treated Ground Water |
|---|---|---|
| pH-value | 7.10 | 7.65 |
| $O_2$-content | 4.2 mg/l | <20 micrograms |
| nitrate | 59 mg/l | 11 mg/l |
| nitrite | <0.1 mg/l | <0.1 mg/l |
| chloride | 102 mg/l | 101 mg/l |
| sulfate | 149 mg/l | 152 mg/l |
| ammonium | <0.05 mg/l | <0.05 mg/l |
| calcium | 172 mg/l | 175 mg/l |
| iron | <0.05 mg/l | <0.05 mg/l |
| manganese | <0.05 mg/l | 0.05 mg/l |

As shown by FIG. 1, the catalyst is stable for months. A contamination of the catalyst does not occur.

We claim:

1. A process for catalytically treating an aqueous liquid contaminated by microorganisms, said process comprising the steps of continuously guiding the liquid through a reactor and contacting the liquid with catalyst particles in the reactor in the absence of hydrazine, hydrazide and hydrazone maintaining the catalyst in a fluidized bed to prevent microorganism contamination of the catalyst without a separate microorganism decontamination step, the catalyst particles having a particle size of from 0.1 to 10 mm; and removing at least one ion selected from the group consisting of nitrite and nitrate from the liquid by reduction with selective formation of nitrogen.

2. A process according to claim 1, wherein said catalyst is particulate catalyst composed of spherical catalyst particles having diameters in the range of from 0.3 to 0.8 mm.

3. A process according to claim 1, wherein the liquid is at a temperature of 11° C.

* * * * *